United States Patent [19]

Minoru

[11] Patent Number: 4,662,477
[45] Date of Patent: May 5, 1987

[54] DRIVE MECHANISM FOR TOY RUNNING VEHICLES

[76] Inventor: Ishida Minoru, 8-302, Ikenohata 4-chome 8, Taito-ku, Tokyo, Japan

[21] Appl. No.: 784,307

[22] Filed: Oct. 4, 1985

[30] Foreign Application Priority Data

Oct. 31, 1984 [JP] Japan .......................... 59-165542[U]
May 1, 1985 [JP] Japan .......................... 60-65299[U]

[51] Int. Cl.$^4$ ............................................. F03G 1/00
[52] U.S. Cl. ........................................ 185/45; 185/39; 185/DIG. 1; 267/156; 446/464
[58] Field of Search ............... 185/37, 39, 45, DIG. 1; 242/107 R, 107.5; 267/59, 156; 446/464

[56] References Cited

U.S. PATENT DOCUMENTS 4,469,197 9/1984 Minoru ................................. 185/45

FOREIGN PATENT DOCUMENTS 51-37092 3/1976 Japan .
55-30144 2/1980 Japan .

Primary Examiner—Allan D. Herrmann
Attorney, Agent, or Firm—Holman & Stern

[57] ABSTRACT

A drive mechanism using a spiral spring as a driving force for driving toy motorcars and other running toys comprises a frame having a mounting hole for easily assembling a spiral spring within the frame permitting all the components required for constructing the mechanism, except for a spiral spring, to be preassembled completely and the spiral spring may later be conveniently inserted from outside the frame, the spiral spring in the first embodiment having at its fore end an engaging part while in the second embodiment no such end engaging part is required, permitting a very easy assembling of the spiral spring.

2 Claims, 17 Drawing Figures

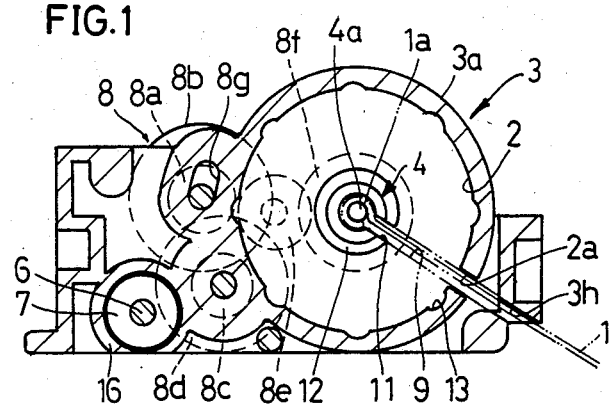
FIG.1
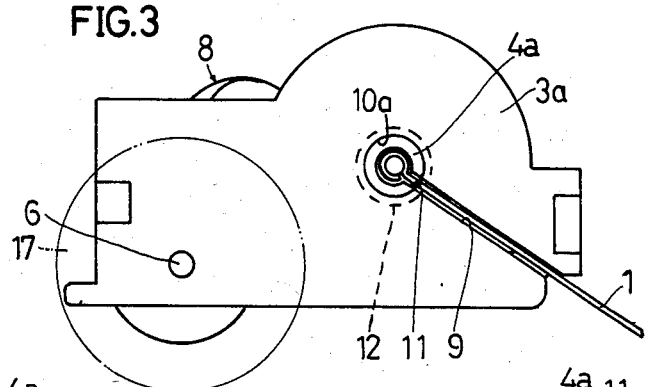
FIG.3
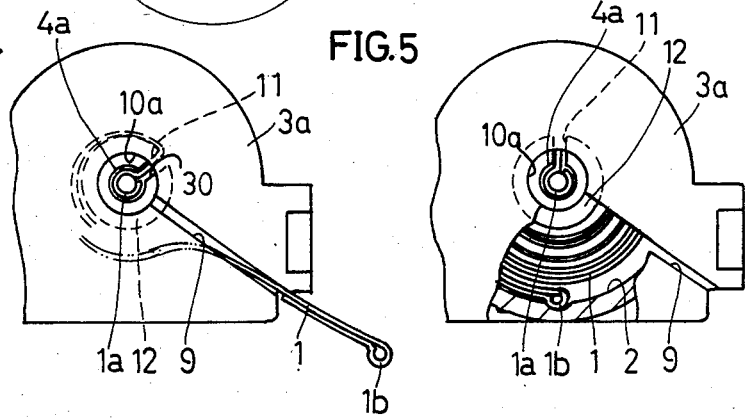
FIG.4
FIG.5

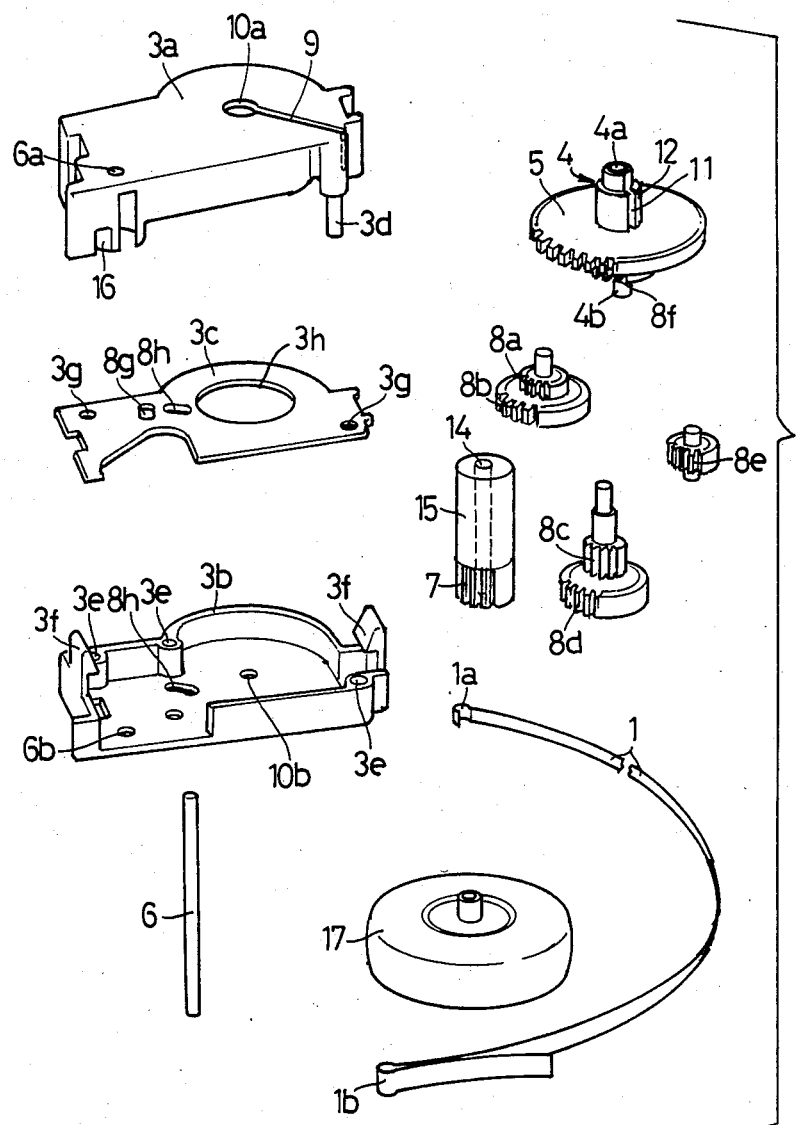

DRIVE MECHANISM FOR TOY RUNNING VEHICLES

BACKGROUND OF THE INVENTION

This invention relates to improvements in a spiral spring drive mechanism for toy running vehicles.

DESCRIPTION OF THE PRIOR ART

Among known mechanisms for driving toy running vehicles with spiral springs that store power by means of reverse rotation of wheels and the like there are the Japanese Utility Model Laid Open Application No. Sho-51-37092 and the Japanese Utility Model Laid Open Application No. Sho-55-30144.

In the 37092 case, a spiral spring is employed having a notch at the outer end portion thereof for engagement with the engaging part prepared in the case to make it possible for the spring to store power by winding up thereof. However, such a manner of securing the spiral spring may have a possibility of cutting the spring due to overwinding of the spring.

In the 30144 case, a case is employed having on its inside wall surface a spiral spring receiving recess, and on the inner peripheral wall of the recess there is provided a plurality of circumferentially spaced small indented recesses such that in engaging a small shaft-like projection formed at the outer end part of the spiral spring with one of the aforementioned small recesses, when the winding torque of the spiral spring excels the engaging force of the projection with the small recess the projection may disengage from the the small recess to prevent the spring from being cut.

In the latter case, however, it is necessary for the spring to be installed into the receiving portion in a coiled up form so that it may be troublesome to install the spring and, in particular, when the spring to be installed is of a small size it may become significantly inefficient to manually wind and install it, making it unsuitable for practical uses.

Among drive mechanisms of these types, the one most generally used comprises a case having a length of 25 mm and the spiral spring receiving portion has a diameter of about 10 mm.

BRIEF SUMMARY OF THE INVENTION

An object of this invention is therefore to provide a drive mechanism for toy running vehicles which can be installed easily, manufactured efficiently, and handled conveniently.

Another object of the present invention is to provide a drive mechanism for toy running vehicles wherein a spiral spring can be installed into a receiving recess formed within a frame closed except for a small opening through which is to be inserted the spring from outside.

Still another object of the present invention is to provide a drive mechanism for toy running vehicles wherein a spiral spring can be assembled within a circular recess by inserting the spring from outside the frame through a small opening provided in the frame and by engaging the end portion of the spring with the engaging cylinder which is integral with the drive gear, thus making it significantly easy to manufacture and moreover making it possible to confirm the assembled condition of the spring so that there may arise no problem of the spring being incorrectly set or becoming inoperative after assembly.

A further object of the present invention is to provide a drive mechanism for toy running vehicles wherein a spiral spring can be installed after the frame has been assembled to make it possible to selectively assemble any spring of stronger or weaker force or of longer or shorter length as may be required after the frame has been assembled, and the shaft may also be mounted later similarly which allows for simply frames of formed material to be stored for completion with preselected springs and shafts specially ordered and to be shipped subsequently.

BRIEF DESCRIPTION OF THE DRAWINGS

The invention will now be described in detail with reference to the accompanying drawings wherein:

FIG. 1 is a cross-sectional view of the main part of the drive mechanism of the invention taken along line I—I of FIG. 6;

FIG. 2 is an exploded perspective view of the components of the present invention;

FIG. 3 is a side elevational view of the invention;

FIGS. 4 and 5 are partial side elevational and cutaway views showing the winding course of a spring;

FIG. 17 is a perspective view of a modification of a mounting shaft.

DETAILED DESCRIPTION

Figure 6:
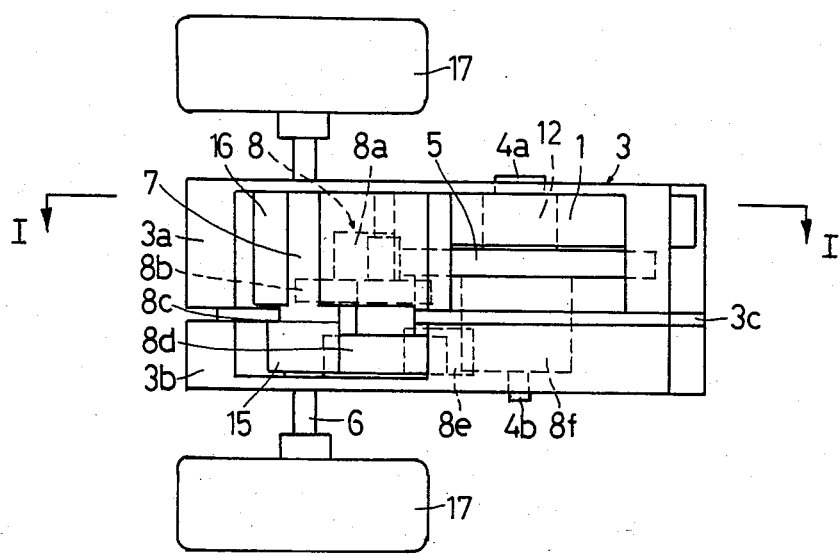
FIG. 6 is a bottom view of FIG. 3.
Figure 7:
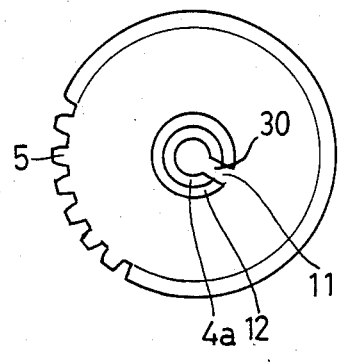
FIG. 7 is a partial enlarged elevational view of the central part of the driven gear.
Figure 8:
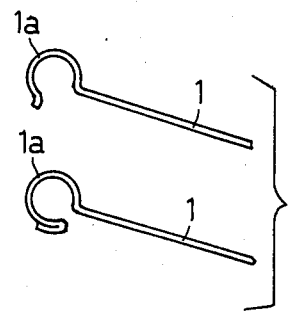
FIG. 8 is a side elevational view showing two examples of the end portion of the spring.

In the first embodiment with reference to FIGS. 1 to 8, 1 is a spring with its rear end portion folded to form an engaging part 1b; 2 indicates a circular reception recess formed within a frame 3 of the drive mechanism for accommodation of the spring 1 and a shaft 4 is rotatably mounted at the center thereof. The end part (the inner end part) 1a of the spring 1 may be formed in advance in a circular or semicircular shape (See FIG. 8). As shown in FIG. 2, the frame 3 of the embodiment is divided into two parts, namely, parts 3a and 3b, and there is interposed a middle frame 3c between the parts 3a and 3b, both parts 3a and 3b being assembled by a connecting means consisting of a projection 3d and an inserting hole 3e and a pawl 3f. 10a, 10b are holes for inserting the shaft 4 and 3g is a hole provided in the middle frame 3c for inserting the projection.

5 is a driven gear formed integral with the shaft 4 and has on its both sides at the center thereof a thick shaft portion 4a and a thin shaft portion 4b, the former being provided with an engaging cylinder 12 for the spiral spring. The engaging cylinder 12 is provided at one side thereof with a slot 11 and shaft portion 4a has an aligned slot 30 therein serving to engage the end part 1a of the spring 1 with the shaft 4. On the outer wall of the frame 3 there is provided a channel, or slot, 9 through which may be guided the spring 1 from the holes 10a, 10b toward the bottom end of the frame 3. The channel 9 leads to the outside through a slot 2a provided in the circular wall of the recess 2 and through a slot 3h cut in the wall of the frame 3. At the other side of the shaft 4 formed integral with the driven gear 5 there is provided a 6th gear 8f which projects to the part 3b through hole 3h in the middle frame 3c. The driven gear 5, 6th gear 8f and sprial spring engaging cylinder 12 may be separately formed and assembled.

The reference numeral 6 designates a shaft to be inserted into the shaft holes 6a, 6b of the frame parts 3a, 3b, respectively; 7 is an output gear fixed to or formed integral with the shaft 6; 8 is a gear system interconnecting the gear 7 and the driven gear 5 and comprises a drive system consisting of a first gear 8a engageable with the driven gear 5, a second gear 8b coaxial with the first gear, a third gear 8c engaging with the second gear 8b, and a 4th gear 8d coaxial therewith, and a power storing system associating with the 6th gear 8f coaxial with the driven gear 5 through the medium of a 5th gear 8e engageable with the 4th gear 8d. The gear system is supported in slanted holes 8g and 8h so that the set of the first and second gear 8a, 8b and the 5th gear 8e may respectively engage only at the time when the sprial spring is released and the force is stored and in other cases may run at idle. 14 is a hole provided in the output gear 7 for inserting the shaft 6; 15 is a cylindrical member with the output gear 7 formed at its one end; 16 is a cylindrical member provided within the frame 3(3a) to rotatably hold the member 15; and 17 indicates a toy wheel.

In the construction described above, when the drive system of the gear mechanism 8 is mainly assembled on one side (the left-hand side) of the middle frame 3c of the frame 3 and the power storing system on the other side (the right-hand side), the member with the driven gear 5 formed therewith will be mounted by the thick shaft 4a and the thin shaft 4b of the shaft 4 and the output gear 7 by the cylindrical portion 16 respectively so that no further steps will be required other than to set the spring 1 within the circular recess 2 and strike the shaft 6 into the cylindrical member 15. For setting the spring 1, the end part 1a is first inserted into the engaging cylinder 12 of the shaft through slot 30 and 11 the other part being inserted from outside into the L-shaped channel 9 and further into the recess 2 (FIG. 4) while the shaft 4 is being rotated, until the end engaging part 1b has been fully inserted into the recess 2 (FIG. 5). Further insertion of the spring 1 into the recess 2 will engage the end part 1b of the spring within any one of the recesses 13 to stop it therein.

Figure 9:
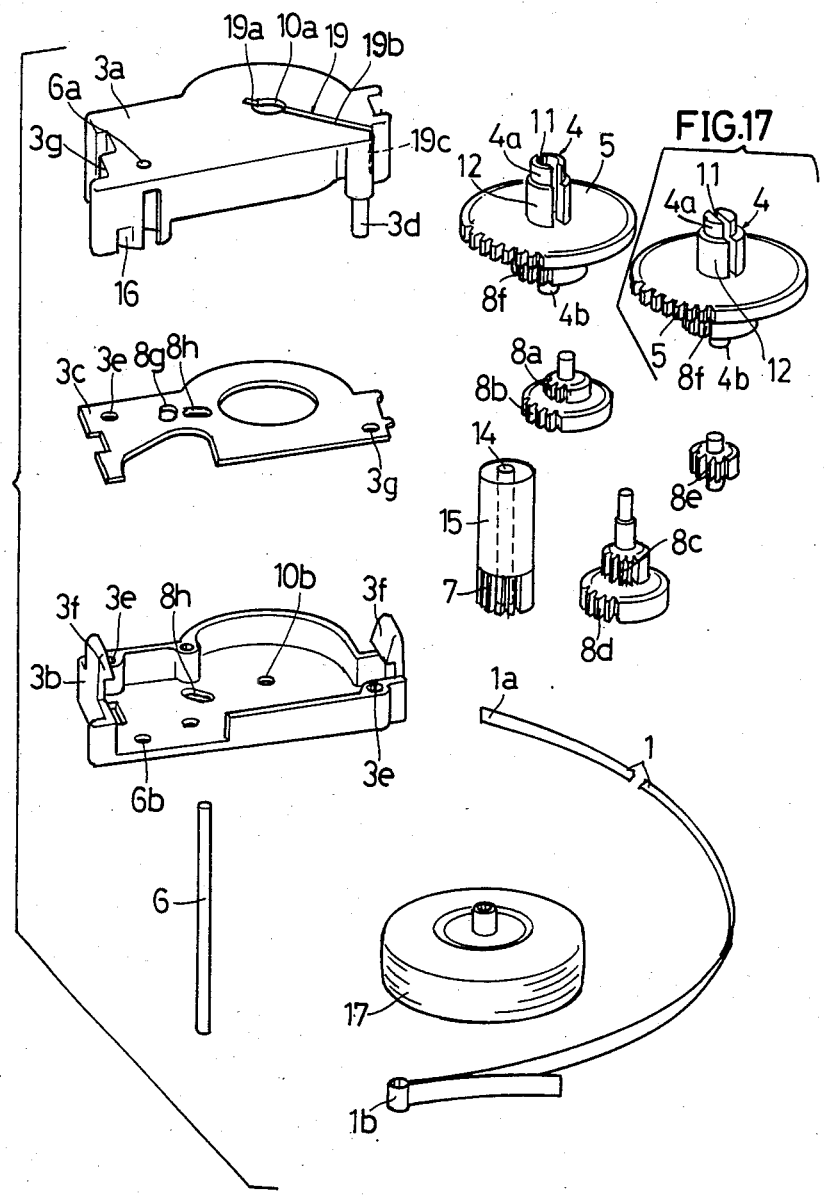
FIG. 9 is an exploded perspective view of another embodiment of the invention.
Figure 10:
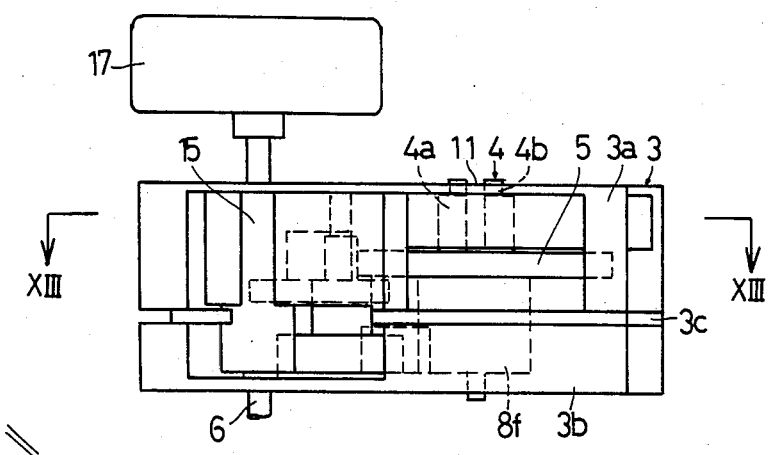
FIG. 10 is a bottom view of the embodiment of FIG. 9.

Now, the second embodiment of the invention will be described with reference to FIGS. 9 through 17, wherein the reference numeral 1 is a spring having its one end in a straight form and folded to form an engaging part 1b; 2 is a circular reception recess portion formed within the frame 3 of the drive mechanism for accommodating the spring 1, and on the inner peripheral surface thereof it has a plurality of small recesses 13 for receiving the outer end of the engaging part 1b of the spring, and also at the center thereof it has holes 10a and 10b into which is to be rotatably inserted the end of shaft 4. The end part 1a has a straight form. The frame 3 of this second embodiment is, as in the case of the first embodiment, divided into two parts, 3a and 3b, and between the two parts at the boundary thereof there is interposed a middle frame 3c, and both parts 3a and 3b are assembled into an integral body through the connecting means consisting of the projection 3d, the holes 3e, 3g and the pawl 3f. The shaft 4 may be of a hollow type as shown in FIG. 9 or of a solid type as shown in FIG. 17.

The driven gear 5 formed integral with the shaft 4 consists of the thick shaft part 4a and the thin shaft part 4b to be used for mounting bearing portions and spring engaging part 12, and the slot 11 is provided through both parts 4a and 12 for insertion of the spring end part 1a therebetween. Also, in the outer wall of the frame 3a there is formed a slot 19 leading from the bottom part thereof to the hole 10a and further to the end part 19a of the shaft part 12, and such slot 19 moreover passes through slots 19b, 19c to form substantially an L-shaped form to pass through all the area outside and inside of the frame. Other components relating to the drive mechanism may be identical to those of the first embodiment so that the reference numerals similar to those used in FIGS. 1 to 8 have been used also in FIGS. 9 through 17 and the description as to each parts thereof has been omitted.

Figure 11:
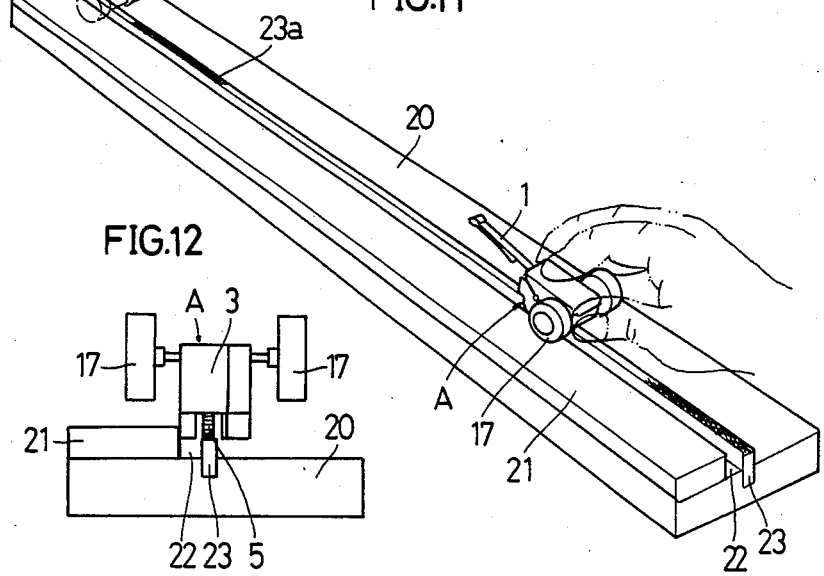
FIG. 11 is a perspective view showing a state of application of a supplementary member of the spring winding.
Figure 12:
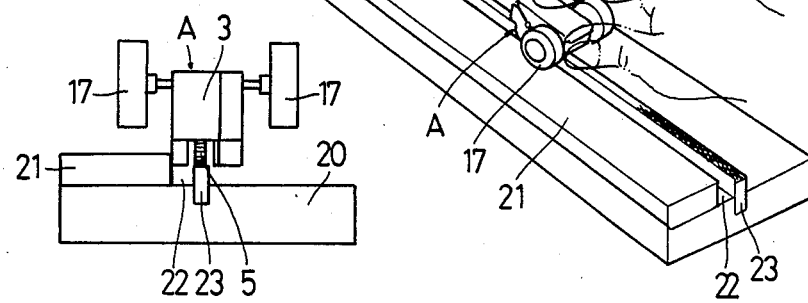
FIG. 12 is a front end elevational view of FIG. 11.
Figure 13:
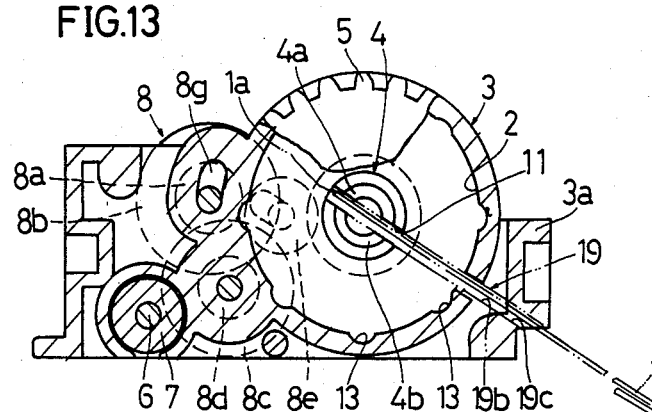
FIG. 13 is a cross-sectional view taken along line XIII—XIII of FIG. 10 showing the spiral spring winding course.
Figure 14:
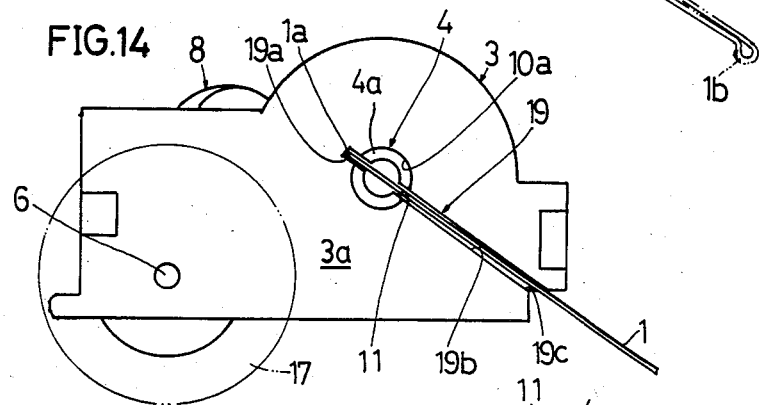
FIG. 14 is a side elevational view of the embodiment of FIG. 9.
Figure 15:
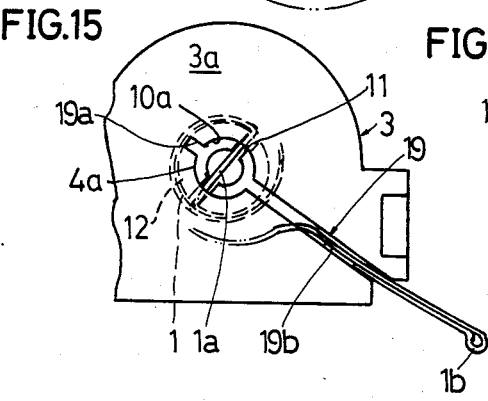
FIGS. 15 and 16 are views similar to FIGS. 4 and 5 of the spiral spring winding course of the embodiment of FIG. 9.
Figure 16:
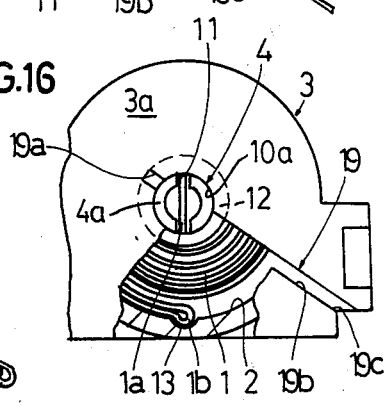

FIGS. 11 and 12 show an assisting tool for assembling a spring 1 into the drive mechanism A constructed as described above the tool having on one side of its longitudinal main plate 20 a friction strap 21 fixed along the longitudinal direction thereof, a winding strip 23 with a gap 22 provided in parallel to the friction strap 21, the strip 23 having thin notches 23a on the surface thereof to provide it with high frictional slide-blocking efficiency.

In the above-described construction, in order to set the spring 1 the end 1a is first inserted into the slot 11 of the shaft 4 (FIGS. 13 and 14) the other portion being wound through the slot 19 into the recess 2 while rotating the shaft 4 (FIG. 15) to provide that the outer engaging part 1b may engage any of the recesses 13 and be fixed. In that case, if the spring 1 is wound with the driven gear 5 pressed to the winding strip 23 the winding operation may be effected more smoothly and efficiently. And when the end part 1a of the spring 1 is inserted into the slot 11 of the shaft 4, if it is inserted into such a position that it may project outwardly of the thick shaft part 4a, it may flex in a hook-like manner so that it may become possible to secure the end part 1a in the shaft 4 more surely.

Accordingly, in the second embodiment the spring 1 may have its end part 1a straight (it may have the habit of being wound) so that it need only be shaped at the outer engaging part 1b.

I claim:

1. A drive mechanism for toy running vehicles comprising:
 a frame;
 a spiral spring receiving recess in said frame;
 a spiral spring mounting shaft mounted on said frame;
 a bearing hole in said frame for mounting one end of said spiral spring mounting shaft;
 a curved inner end part on said spring;
 an outer end engaging part on said spring;
 a driving gear integral with said spring mounting shaft;
 a driven shaft rotatably mounted on said frame;

a driven gear on said driven shaft;

a gear mechanism mounted within said frame for connecting said driving gear and said driven gear;

a plurality of circumferentially spaced small indented recesses on the inner peripheral wall of said circular recess for receiving the outer end engaging part of said spring;

a spring engaging cylinder on the central part of said spiral spring mounting shaft having a fore end part;

a slot formed at the fore end part of said engaging cylinder and the adjacent end part of said spiral spring mounting shaft for engaging said curved end part of said spiral spring with said spiral spring mounting shaft; and a guide slot formed in said frame communicating between the outside of said frame through said circular recess part to said bearing hole.

2. A drive mechanism for toy running vehicles comprising:

a frame;

a spiral spring receiving recess in said frame;

a spiral spring mounting shaft mounted on said frame;

a bearing hole in said frame for mounting one end of said spiral spring mounting shaft;

a straight inner end part on said spring;

an outer end engaging part on said spring;

a driving gear integral with said spring mounting shaft;

a driven shaft rotatably mounted on said frame;

a driven gear on said driven shaft;

a gear mechanism mounted within said frame for connecting said driving gear and said driven gear;

a plurality of circumferentially spaced small indented recesses on the inner peripheral wall of said circular recess for receiving the outer end engaging part of said spring;

an inserting slot at the end of said spring mounting shaft mounted in said bearing hole for engaging said straight end part of said spiral spring with said shaft; and a guide slot in said frame extending between the outside of said frame through said circular recess and through and beyond said bearing hole.

* * * * *